J. M. VERNON.

Improvement in Compensation-Journal.

No. 129,911.                Patented July 30, 1872.

WITNESSES:

INVENTOR:
James M. Vernon.
By Wells W. Leggett,
Attorney.

UNITED STATES PATENT OFFICE.

JAMES M. VERNON, OF MOUNT VERNON, OHIO.

IMPROVEMENT IN COMPENSATION-JOURNALS.

Specification forming part of Letters Patent No. 129,911, dated July 30, 1872.

*To all whom it may concern:*

Be it known that I, JAMES M. VERNON, of Mount Vernon, county of Knox, State of Ohio, have invented a new and Improved Compensation-Journal for taking up the lost motion created at the axles of wheels on sewing-machines, &c.; and I declare the following to be a full, clear, and exact description of the same, such as will enable others skilled in the art to which it pertains to make and use it, reference being had to the accompanying drawing which forms a part of this specification.

My invention relates to a journal so formed with conical bearings that by forcing the cones toward each other the wear is compensated by the enlargement of the surfaces of the axle.

Figure 1:
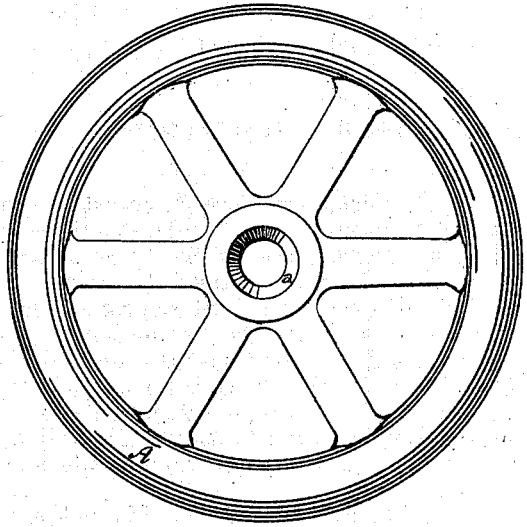
Figure 2:
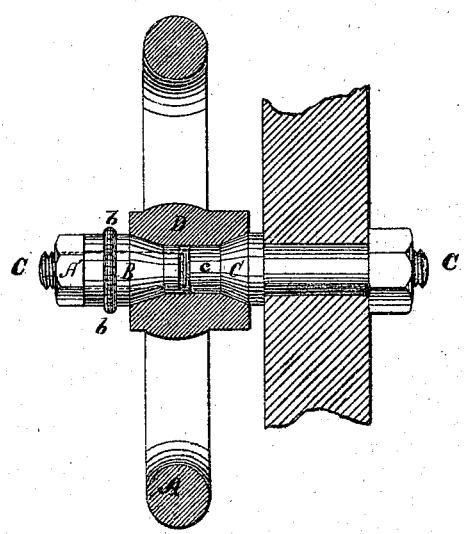

In the drawing, Figure 1 is a view of a wheel, A, having its bearing-surface $a$ upon the axle conical in form. Fig. 2 is a sectional view of wheel A through the axle, in which D is the hub or boxing, having its interior surface near the edges reamed out into a conical form. C is a conical bearing, terminating in a screw, C'. B is a conical nut. A' is a follower.

My invention consists as follows: Instead of having the journal cylindrical, as is usually the case, or conical, as is the form usually employed in carriage-wheels, I make the axle cylindrical for a short distance at $c$, terminating in a conical surface, C, the cylindrical portion $c$ extending about or nearly half the distance through the wheel. At this point is a square offset, and the axle terminates in a long bolt or screw. Upon this is run the conical nut B, which, being forced against its counter conical surface in the hub D, sets the wheel to a firm bearing, and is then prevented from running off again by the follower A'. When the wheel has run until the conical surfaces are worn so as to cause lost motion or jarring, the nut B is screwed a little tighter and the follower A is forced down upon it, and it is as firm as ever. I propose to provide the nut B with a milled head to facilitate handling, and design using it upon sewing-machines particularly.

Having thus described my invention, what I claim as new, and desire to secure by Letters Patent, is—

1. A compensation-journal, consisting f the bolt $c$, having a shank and clamping-nut for securing it to the frame, and provided with the fixed conical shoulder C, in combination with the movable conical shoulder B and wheel D, when the said parts are so arranged that a space is left between the shoulders so that the shoulder B may be fed up to compensate for the wear, substantially as set forth.

2. The shank C, provided with a fixed conical shoulder and a movable one, B, sufficient space being left between the two to allow the movable one, B, to be fed up to compensate for the wear, substantially as set forth.

JAMES M. VERNON.

Witnesses:
C. P. GREGORY,
SAML. McFADDEN.